(12) United States Patent
Hendry et al.

(10) Patent No.: US 11,184,624 B2
(45) Date of Patent: Nov. 23, 2021

(54) REGIONAL RANDOM ACCESS IN PICTURES

(71) Applicant: QUALCOMM Incorporated, San Diego, CA (US)

(72) Inventors: Fnu Hendry, San Diego, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 15/599,295

(22) Filed: May 18, 2017

(65) Prior Publication Data

US 2017/0339416 A1 Nov. 23, 2017

Related U.S. Application Data

(60) Provisional application No. 62/339,012, filed on May 19, 2016.

(51) Int. Cl.
*H04N 19/167* (2014.01)
*H04N 19/70* (2014.01)
(Continued)

(52) U.S. Cl.
CPC ......... *H04N 19/167* (2014.11); *H04N 19/176* (2014.11); *H04N 19/597* (2014.11); *H04N 19/68* (2014.11); *H04N 19/70* (2014.11)

(58) Field of Classification Search
CPC ....... H04N 19/46; H04N 19/68; H04N 19/176
See application file for complete search history.

(56) References Cited

U.S. PATENT DOCUMENTS 10,390,049 B2 *   8/2019  Deshpande ............. H04L 47/56
2006/0034367 A1 * 2/2006  Park ....................... H04N 19/12
                                                 375/240.01
(Continued)

FOREIGN PATENT DOCUMENTS

CN      102100069 A    6/2011
CN      105519118 A    4/2016
WO      2015004323 A1  1/2015

OTHER PUBLICATIONS

"Draft DoC on ISO/IEC DIS 14496-15 4th edition", 114, MPEG Meeting; Feb. 22, 2016-Feb. 26, 2016; San Diego; (Motion Picture Expert Group or ISO/IEC JTC1/SC29/WG11 ), No. N15927, Mar. 2, 2016, XP030022601, 42 pages.

(Continued)

*Primary Examiner* — Jayanti K Patel
*Assistant Examiner* — Christopher Kingsbury Glover
(74) *Attorney, Agent, or Firm* — Shumaker & Sieffert, P.A.

(57) ABSTRACT

In general, the disclosure relates to techniques for regional random access within a picture of video data. For example, a video coding device receives a plurality of pictures in a coding order. Each respective picture of the plurality of pictures comprises a plurality of regions. For a first region in a first picture of the plurality of pictures, the video coding device determines that the first region is codable independent from each other region of the first picture and from a first region in a second picture preceding the first picture in the coding order and, responsive to making such a determination, determine that the first region in the first picture has random accessibility. The video coding device codes each video block in the first region independent from any video blocks outside of the first region.

17 Claims, 11 Drawing Sheets

(51) Int. Cl.
*H04N 19/597* (2014.01)
*H04N 19/176* (2014.01)
*H04N 19/68* (2014.01)

(56) References Cited

U.S. PATENT DOCUMENTS

| | | | |
|---|---|---|---|
| 2010/0232520 A1* | 9/2010 | Wu | H04N 19/68 375/240.26 |
| 2011/0110418 A1* | 5/2011 | Lu | H04N 19/68 375/240.02 |
| 2015/0195555 A1 | 7/2015 | Hendry et al. | |
| 2016/0156917 A1 | 6/2016 | Ugur et al. | |

OTHER PUBLICATIONS

International Search Report and Written Opinion—PCT/US2017/033543—ISA/EPO—dated Jul. 18, 2017.
Sanchez Y., et al., "Compressed Domain Video Processing for Tile Based Panoramic Streaming using HEVC," 2015 IEEE International Conference on Image Processing (ICIP), Sep. 27, 2015, pp. 2244-2248, XP032826822, DOI:10.1109/ICIP.2015.7351200 [retrieved on Dec. 9, 2015] the whole document.
Sanchez Y., eta al., "Compressed Domain Video Processing for Tile Based Panoramic Streaming using SHVC," Immersive Media Experiences, ACM, Oct. 30, 2015, XP058074928, pp. 13-18.
Skupin R., et al., "On MCTS Extraction," 24. JCT-VC Meeting; May 26, 2016 to Jan. 6, 2016; Geneva; (Joint Collaborative Team on Video Coding of ISO/IEC JTC1/SC29/WG11 and ITU-TSG.16); URL: http://wftp3.itu.int/av-arch/jctvc-site/,, No. JCTVC-X0039, May 16, 2016, XP030117966, the whole document.
"Study of ISO/IEC DIS 14496-15 4th Edition", 113, MPEG Meeting, Oct. 19, 2015-Oct. 23, 2015; Geneva; (Motion Picture Expert Group or ISO/IEC JTC1/SC29/WG11), No. N15640, Dec. 7, 2015, 172 pp, XP030022328.
Tech et al., "MV-HEVC Draft Text 8", Joint Collaborative Team on Video Coding Extensions of ITU-T SG16 WP3 and ISO/IEC JTC1/SC29/WG11 8th Meeting: Valencia, ES, Mar. 29-Apr. 4, 2014, JCT3V-H1002-v5, May 10, 2014, 12 pp.
Wang et al., "High Efficiency Video Coding (HEVC) Defect Report", Joint Collaborative Team on Video Coding (JCT-VC) of ITU-T SG16 WP3 and ISO/IEC JTC1/SC29/WG11 14th Meeting: Vienna, AT, Jul. 25-Aug. 2, 2013, JCT-VC-N1003_v1, Sep. 27, 2013, 311 pp.
Chen et al., "Preliminary version of High efficiency video coding (HEVC) scalable extension Draft 6", Joint Collaborative Team on Video Coding (JCT-VC) of ITU-T SG16 and ISO/IEC JTC1/SC29/WG11 17th Meeting: Valencia, ES, Mar. 27-Apr. 4, 2014, JCTVC-Q1008_v2, May 10, 2014, 158 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.
Denoual F., et al., "Comments on tile tracks and descriptors in draft text for ISO/IEC 14496-15 FDIS 4th edition," 115th MPEG Meeting; May 30, 2016-Jun. 3, 2016; Geneva, CH (Motion Picture Expert Group or ISO/IEC JTC1/SC29/WG11), No. m38242, Apr. 27, 2016, XP030066598, 7 pp.
"Study of ISO/IEC DIS 14496-15 4th Edition," 113, MPEG Meeting, Oct. 19, 2015-Oct. 23, 2015; Geneva, CH [Motion Picture Expert Group or ISO/IEC JTC1/SC29/WG11), No. N15640, Dec. 7, 2015, 172 pp., XP030022328.
Response to the Written Opinion dated Jul. 18, 2017, in International Application No. PCT/US2017/033543 filed Mar. 16, 2018, 6 pp.
Second Written Opinion issued in International Application No. PCT/US2017/033543 dated Apr. 20, 2018, 18 pp.
International Preliminary Report on Patentability of International Application No. PCT/US2017/033543 dated Jul. 17, 2018, 12 pp.

* cited by examiner

← Non-random accessible region       ← Random accessible region

REGIONAL RANDOM ACCESS IN PICTURES

This application claims the benefit of U.S. Provisional Application No. 62/339,012, filed May 19, 2016, the entire content of which is incorporated by reference herein.

TECHNICAL FIELD

The disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in various standards including defined by ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 or ISO/IEC MPEG-4 AVC, including its Scalable Video Coding (SVC) and Multiview Video Coding (MVC) extensions, and High-Efficiency Video Coding (HEVC), also known as ITU-T H.265 and ISO/IEC 23008-2, including its scalable coding extension (i.e., scalable high-efficiency video coding, SHVC), multiview extension (i.e., multiview high efficiency video coding, MV-HEVC), and 3D extension (i.e., 3D high efficiency video coding, 3D-HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, the disclosure relates to techniques for regional random access within a picture of video data. For example, a video coding device may receive a plurality of pictures in a coding order. Each respective picture of the plurality of pictures comprises a plurality of regions. For a first region in a first picture of the plurality of pictures, the video coding device may determine that the first region is codable independent from each other region of the first picture and that the first region is codable independent from a first region in a second picture preceding the first picture in the coding order and, responsive to determining that the first region is codable independent from each other region of the first picture and that the first region is codable independent from the first region in the second picture preceding the first picture in the coding order, determine that the first region in the first picture has random accessibility. The video coding device may code each video block in the first region in the first picture independent from each other region of the first picture and independent from the first region in the second picture preceding the first picture in the coding order.

In one example, the disclosure is directed to a method of coding video data that includes receiving a plurality of pictures in a coding order, wherein each respective picture of the plurality of pictures comprises a plurality of regions; for a first region in a first picture of the plurality of pictures: determining that the first region is codable independent from each other region of the first picture and that the first region is codable independent from a first region in a second picture preceding the first picture in the coding order; and responsive to determining that the first region is codable independent from each other region of the first picture and that the first region is codable independent from the first region in the second picture preceding the first picture in the coding order, determining that the first region in the first picture has random accessibility; and coding each video block in the first region in the first picture independent from each other region of the first picture and independent from the first region in the second picture preceding the first picture in the coding order.

In another example, the disclosure is directed to a video coding device including a memory configured to store video data; and one or more processors configured to: receive a plurality of pictures in a coding order, wherein each respective picture of the plurality of pictures comprises a plurality of regions; for a first region in a first picture of the plurality of pictures: determine that the first region is codable independent from each other region of the first picture and that the first region is codable independent from a first region in a second picture preceding the first picture in the coding order; and responsive to determining that the first region is codable independent from each other region of the first picture and that the first region is codable independent from the first region in the second picture preceding the first picture in the coding order, determine that the first region in the first picture has random accessibility; and code each video block in the first region in the first picture independent from each other region of the first picture and independent from the first region in the second picture preceding the first picture in the coding order.

In another example, the disclosure is directed to an apparatus for video coding, the apparatus including means for receiving a plurality of pictures in a coding order, wherein each respective picture of the plurality of pictures comprises a plurality of regions; for a first region in a first picture of the plurality of pictures: means for determining that the first region is codable independent from each other region of the first picture and that the first region is codable independent from a first region in a second picture preceding the first picture in the coding order; and means for determining that the first region in the first picture has random accessibility in response to determining that the first region is codable independent from each other region of the first picture and that the first region is codable independent from the first region in the second picture preceding the first picture in the coding order; and means for coding each video block in the first region in the first picture independent from each other region of the first picture and independent from the first region in the second picture preceding the first picture in the coding order.

In another example, the disclosure is directed to a non-transitory computer-readable storage medium storing instructions that, when executed by one or more processors of a video coding device, cause the one or more processors to: receive a plurality of pictures in a coding order, wherein each respective picture of the plurality of pictures comprises a plurality of regions; for a first region in a first picture of the plurality of pictures: determine that the first region is codable independent from each other region of the first picture and that the first region is codable independent from a first region in a second picture preceding the first picture in the coding order; and responsive to determining that the first region is codable independent from each other region of the first picture and that the first region is codable independent from the first region in the second picture preceding the first picture in the coding order, determine that the first region in the first picture has random accessibility; and code each video block in the first region in the first picture independent from each other region of the first picture and independent from the first region in the second picture preceding the first picture in the coding order.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
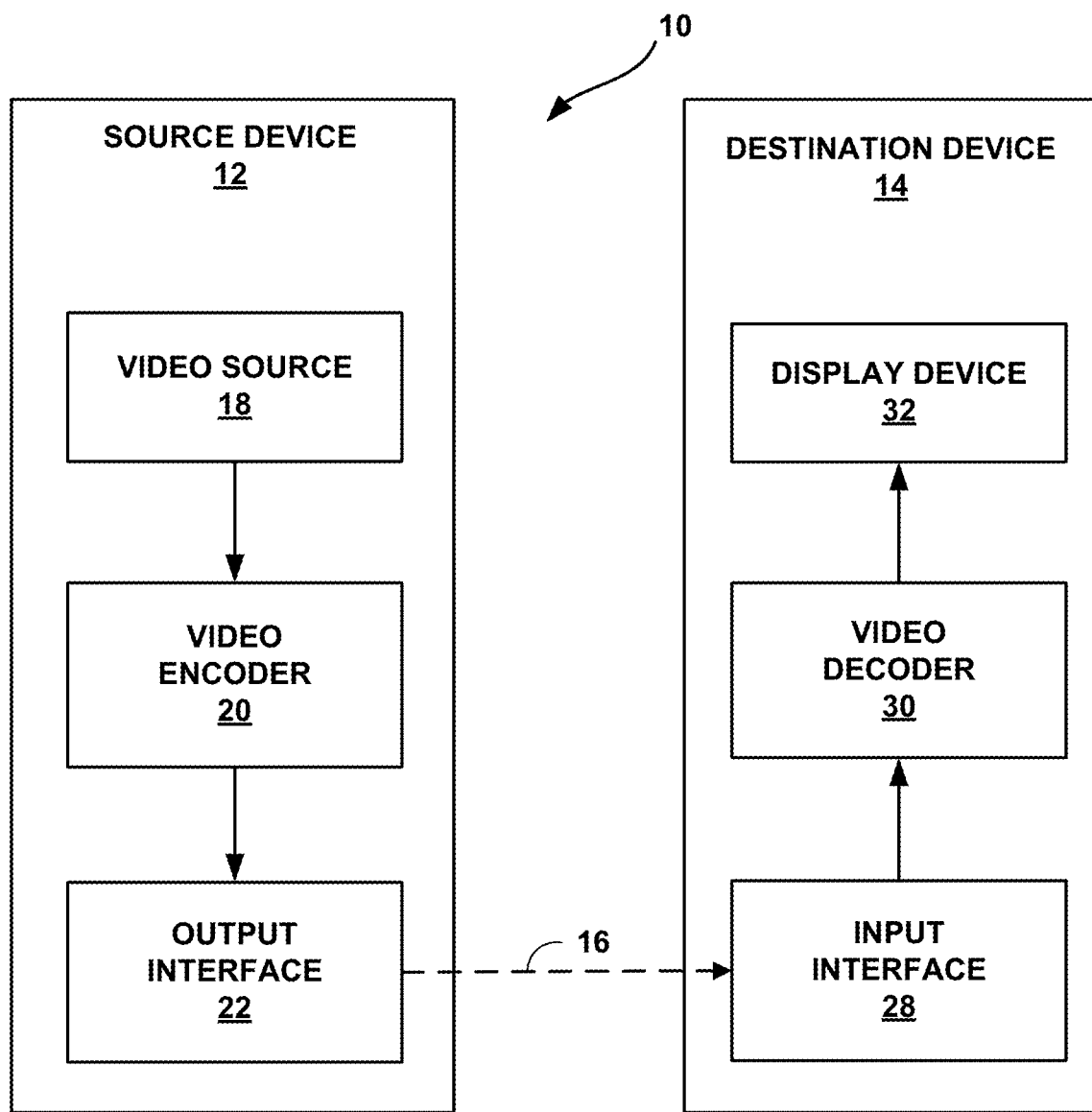
FIG. 1 is a block diagram illustrating an example video encoding and decoding system that may utilize techniques described in this disclosure.

In general, this disclosure describes techniques related to coding and signaling methods for coding a region in a video sequence in a way that the region may be random accessed starting from a particular picture while other regions may or may not be random accessed starting from that particular picture. In other words, the techniques described herein may enable a video coder to encode a picture such that only a portion of the picture is randomly accessible rather than the entire picture. Such regional random access may be applied in virtual reality (VR) applications using partial video decoding and any other video applications where randomly accessing only a part of the entire video area may be desirable. For the purposes of this disclosure, coding should not be limited generically to encoding or decoding. Rather, coding is used herein as a general term that may encompass either encoding or decoding or both encoding and decoding.

For instance, in VR applications, when the user's point-of-view changes, the video coding device must begin coding the new point-of-view by locating randomly accessible pictures. However, if the new point-of-view contains fifty pictures that must be decoded, and only a single picture is randomly accessible, the quality of the remaining pictures will be very low while the coding process catches up to the changing point-of-view. However, for the same bitrate, the video coding device may utilize the techniques described herein to have a portion of multiple different pictures be randomly accessible. A video coding device utilizing the techniques described herein benefits from reaching a high-quality VR video output in a shorter amount of time or by greatly decreasing the bitrate of a VR video stream that reaches a high quality in the same amount of time as previous techniques. In this way, the video coding device requires less processing power and consumes less power.

The techniques of this disclosure are generally described with respect to ITU-T H.265, also referred to as High Efficiency Video Coding (HEVC), which is described in "SERIES H: AUDIOVISUAL AND MULTIMEDIA SYSTEMS, Infrastructure of audiovisual services—Coding of moving video," *High Efficiency Video Coding*, ITU-T H.265, April 2013, including its scalable coding extension (i.e., scalable high-efficiency video coding, SHVC), multi-view extension (i.e., multiview high efficiency video coding, MV-HEVC), and 3D extension (i.e., 3D high efficiency video coding, 3D-HEVC). However, these techniques may be applied to other video coding standards, including extensions of HEVC and extensions of other standards. Examples of other video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 or ISO/IEC MPEG-4 AVC, including its Scalable Video Coding (SVC) and Multiview Video Coding (MVC) extensions, and High-Efficiency Video Coding (HEVC), also known as ITU-T H.265 and ISO/IEC 23008-2, including its scalable coding extension (i.e., scalable high-efficiency video coding, SHVC), multiview extension (i.e., multiview high efficiency video coding, MV-HEVC), and 3D extension (i.e., 3D high efficiency video coding, 3D-HEVC), and extensions of such standards.

The H.265 standard was recently finalized by the Joint Collaboration Team on Video Coding (JCT-VC) of ITU-T Video Coding Experts Group (VCEG) and ISO/IEC Motion Picture Experts Group (MPEG). The latest HEVC draft specification is referred to as HEVC WD hereinafter.

The multiview extension to HEVC, MV-HEVC, has also been developed by the JCT-3V. An example of a Working Draft (WD) of MV-HEVC, referred to as MV-HEVC WD8, is available from phenix.it-sudparis.eu/jct2/doc_end_user/documents/8_Valencia/wg11/JCT3V-H1002-v5.zip. A scalable extension to HEVC, named SHVC, has also been developed by the JCT-VC. An example of a Working Draft (WD) of SHVC, referred to as SHVC WD6, is available from phenix.it-sudparis.eu/jct/doc_end_user/documents/17_Valencia/wg11/JCTVC-Q1008-v2.zip.

FIG. 1 is a block diagram illustrating an example video encoding and decoding system 10 that may utilize techniques described in this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques described in this disclosure, such as techniques relating to improved video intra-prediction using position-dependent prediction combination. In accordance with this disclosure, video decoder 30 of destination device 14 may be configured to apply the techniques described in this disclosure, such as techniques relating to improved video intra-prediction using position-dependent prediction combination. In other examples, a source device and a destination device may include other components or arrangements. For example, source device 12 may receive video data from an external video source 18, such as an external camera. Likewise, destination device 14 may interface with an external display device, rather than including an integrated display device.

As noted above, source device 12 includes output interface 22 and destination device 14 includes input interface 28. In some examples, output interface 22 represents a transmitter and input interface 28 represents a receiver. In other examples, output interface 22 and input interface 28 represent examples of transceivers (that is, interfaces capable of both transmitting and receiving data signals wirelessly). The transceivers may be configured to send and receive video data in wireless signals. For example, output interface 22, when implemented as a transceiver, may send a data signal (e.g., computer-readable medium 16) including encoded video data, while input interface 28, when implemented as a transceiver, may receive a data signal (e.g., computer-readable medium 16) including encoded video data. As discussed above, video encoder 20 may provide the encoded video data to output interface 22, while input interface 28 may provide encoded video data to video decoder 30.

The illustrated system 10 of FIG. 1 is merely one example. Techniques described in this disclosure may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the standards described above and, in some examples, according to the High Efficiency Video Coding (HEVC) standard, also referred to as ITU-T H.265, or extensions of the HEVC standard, or according to the next generation of video coding standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to a protocol such as the ITU H.223 multiplexer protocol, or other protocols such as the user datagram protocol (UDP).

Video encoder 20 and video decoder 30 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

In general, a video frame or picture may be divided into a sequence of treeblocks, which are also known as largest coding units (LCUs), that may include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree data structure. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU are also referred to as leaf-CUs even if there is no explicit splitting of the original leaf-CU. For example, if a CU at 16×16 size is not split further, the four 8×8 sub-CUs are also referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, prediction unit (PU), or transform unit (TU), in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and is generally square in shape. The size of the CU may range from 8×8 pixels up to the size of the treeblock with a maximum size, e.g., 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more PUs. In general, a PU represents a spatial area corresponding to all or a portion of the corresponding CU, and may include data for retrieving and/or generating a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. The RQT may also be referred to as a transform tree. In some examples, the intra-prediction mode may be signaled in the leaf-CU syntax, instead of the RQT. As another example, when the PU is inter-mode encoded, the PU may include data defining motion information, such as one or more motion vectors, for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more TUs. The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs) or transform trees as noted above. That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures, starting with a random access point (RAP) picture. A video sequence may include syntax data in a sequence parameter set (SPS) that describes characteristics of the video sequence. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, prediction may be performed for PUs of various sizes. Assuming that the size of a particular CU is 2N×2N, intra-prediction may be performed on PU sizes of 2N×2N or N×N, and inter-prediction may be performed on symmetric PU sizes of 2N×2N, 2N×N, N×2N, or N×N. Asymmetric partitioning for inter-prediction may also be performed for PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block has 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs to include quantized transform coefficients representative of the residual data for the CU. That is, video encoder 20 may calculate the residual data (in the form of a residual block), transform the residual block to produce a block of transform coefficients, and then quantize the transform coefficients to form quantized transform coefficients. Video encoder 20 may form a TU including the quantized transform coefficients, as well as other syntax information (e.g., splitting information for the TU).

As noted above, following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, video encoder 20 may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In general, video decoder 30 performs a substantially similar, albeit reciprocal, process to that performed by video encoder 20 to decode encoded data. For example, video decoder 30 inverse quantizes and inverse transforms coefficients of a received TU to reproduce a residual block. Video decoder 30 uses a signaled prediction mode (intra- or inter-prediction) to form a predicted block. Then video decoder 30 combines the predicted block and the residual block (on a pixel-by-pixel basis) to reproduce the original block. Additional processing may be performed, such as performing a deblocking process to reduce visual artifacts along block boundaries. Furthermore, video decoder 30 may decode syntax elements using CABAC in a manner substantially similar to, albeit reciprocal to, the CABAC encoding process of video encoder 20.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

In accordance with techniques of this disclosure, a video coding device, such as video encoder 20, may determine whether a region in a picture has random accessibility. For instance, video encoder 20 may receive a plurality of pictures in a coding order. Each respective picture of the plurality of pictures comprises a plurality of regions. For a first region in a first picture of the plurality of pictures, video encoder 20 may determine that the first region is codable independent from each other region of the first picture. Video encoder 20 may also determine that the first region is codable independent from a region in each picture that precedes the first picture in the coding order. Responsive to determining that the first region is codable independent from each other region of the first picture and that the first region is codable independent from the first region in the second picture preceding the first picture in the coding order, video encoder 20 may determine that the first respective region in the first picture has random accessibility. Video encoder 20 may then code each video block in the first region in the first picture independent from each other region of the first picture and independent from the first region in the second picture preceding the first picture in the coding order.

Figure 2:
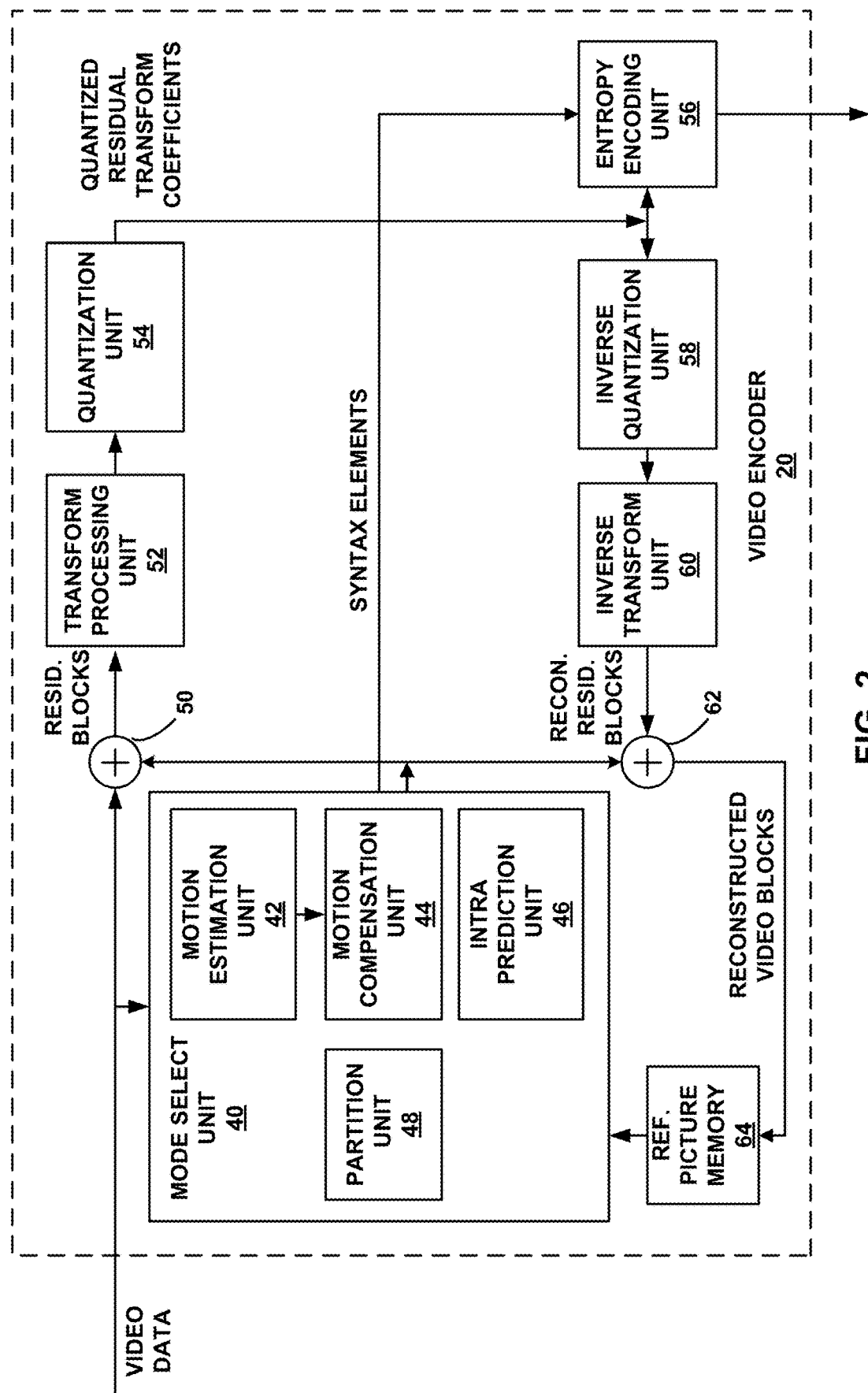
FIG. 2 is a block diagram illustrating an example of a video encoder that may implement techniques described in this disclosure.

FIG. 2 is a block diagram illustrating an example of a video encoder 20 that may implement techniques described in this disclosure. In accordance with this disclosure, video encoder 20 may be configured to receive a plurality of pictures in a coding order, such as from video source 18 of FIG. 1. This is only one example of a video encoder that may perform the techniques described herein. Other video encoders, including video encoders that include additional features or fewer features, may still be enabled to perform the techniques described herein. For instance, video encoder 20 may further include a battery or other power sources. In other instances, video encoder 20 may include a memory or other storage device configured to store input video data.

As shown in FIG. 2, video encoder 20 receives a current video block within a video frame to be encoded. In the example of FIG. 2, video encoder 20 includes mode select unit 40, reference picture memory 64 (which may also be referred to as a decoded picture buffer (DPB)), summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive encoding of the received video block relative to one or more blocks in one or more reference frames to provide temporal prediction. Intra-prediction unit 46 may alternatively perform intra-predictive encoding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the prediction modes, intra or inter, e.g., based on error results, and provides the resulting predicted block to summer 50 to generate residual data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising transform coefficient values. Wavelet transforms, integer transforms, sub-band transforms, discrete sine transforms (DSTs), or other types of transforms could be used instead of a DCT. In any case, transform processing unit 52 applies the transform to the residual block, producing a block of transform coefficients. The transform may convert the residual information from a pixel domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter.

Following quantization, entropy encoding unit 56 scans and entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain. In particular, summer 62 adds the reconstructed residual block to the motion compensated prediction block earlier produced by motion compensation unit 44 or intra-prediction unit 46 to produce a reconstructed video block for storage in reference picture memory 64. The reconstructed video block may be used by motion estimation unit 42 and motion compensation unit 44 as a reference block to inter-code a block in a subsequent video frame.

In accordance with techniques of this disclosure, mode select unit 40 of video encoder 20 may determine whether a region in a picture has random accessibility. For instance, mode select unit 40 of video encoder 20 may receive a plurality of pictures in a coding order. Each respective picture of the plurality of pictures comprises a plurality of regions. For a first region in a first picture of the plurality of pictures, mode select unit 40 of video encoder 20 may determine that the first region is codable independent from each other region of the first picture.

Mode select unit 40 of video encoder 20 may also determine that the first region is codable independent from a region in each picture that precedes the first picture in the coding order. In some examples, the first respective region may be a tile, a slice, a set of tiles, or a set of slices. In some examples, in determining that the first region is codable independent from a first region in a second picture preceding the first picture in the coding order, mode select unit 40 of video encoder 20 may determine that a respective syntax element in a respective NAL unit header in each respective picture preceding the first picture in the coding order indicates that the respective picture is not available.

Responsive to determining that the first region is codable independent from each other region of the first picture and that the first region is codable independent from the first region in the second picture preceding the first picture in the coding order, mode select unit 40 of video encoder 20 may determine that the first respective region in the first picture has random accessibility. Entropy encoding unit 52 of video encoder 20 may then code each video block in the first region in the first picture independent from each other region of the first picture and independent from the first region in the second picture preceding the first picture in the coding order.

If mode select unit 40 of video encoder 20 determines that the first region is not codable independent from other regions of the first picture or that the first region is not codable independent from the first region in the second picture preceding the first picture in the coding order, mode select unit 40 of video encoder 20 may determine that the first respective region in the first picture does not have random accessibility. As such, entropy encoding unit 52 of video encoder 20 may code a video block in the first region in the first picture based at least in part on motion information for a video block in another region of the first picture or based at least in part on motion information for a video block in a region in a picture preceding the first picture in the coding order.

In some examples, mode select unit 40 of video encoder 20 may further determine that each region in the first picture has random accessibility. Responsive to determining that each region in the first picture has random accessibility, mode select unit 40 of video encoder 20 may determine that the first picture is an intra random access point picture. As such, entropy encoding unit 52 of video encoder 20 may code each video block in the first picture independent from each other picture in the coding order.

In some examples, responsive to determining that the first region has random accessibility, mode select unit 40 of video encoder 20 may signal a syntax element that indicates that the first region has random accessibility. The syntax element may be located in a header of the first picture, a header of a slice, a header of the first respective region, a NAL unit header, or in metadata. Entropy encoding unit 52 of video encoder 20 may encode the syntax element in a bitstream.

In some examples, responsive to determining that the first respective region has random accessibility, mode select unit 40 of video encoder 20 may determine that the first picture is an intra random access point picture.

In some examples, mode select unit 40 of video encoder 20 may define a sample grouping to indicate that the first picture has a randomly accessible region. Alternatively, mode select unit 40 of video encoder 20 may define a sample grouping to indicate whether the first picture is fully randomly accessible or whether only a portion of the regions of the first picture are randomly accessible.

In some examples, mode select unit 40 of video encoder 20 may further, for a third picture that follows the first picture in the coding order, determine that a threshold number of pictures in the coding order have been coded since coding the first region of the first picture. Responsive to determining that the threshold number of pictures in the coding order have been coded since coding the first region of the first picture, mode select unit 40 of video encoder 20 may determine that a region in the third picture corresponding to the first region of the first picture has random accessibility. As such, entropy encoding unit 52 of video encoder 20 may code each video block in the region in the third picture corresponding to the first region of the third picture independent from each other region of the third picture and independent from any region in a fourth picture preceding the third picture in the coding order.

Video encoder 20 generally uses the process discussed above to encode each block of each picture in a coded video sequence. In addition, in some examples, video encoder 20 may determine temporal layers to which to assign each of the pictures. Furthermore, video encoder 20 may be configured to encode pictures of other layers, e.g., other views, scalable video coding layers, or the like. In any case, video encoder 20 may further encode data indicating a layer to which each picture belongs, for one or more layers (e.g., of various video dimensions).

Figure 3:
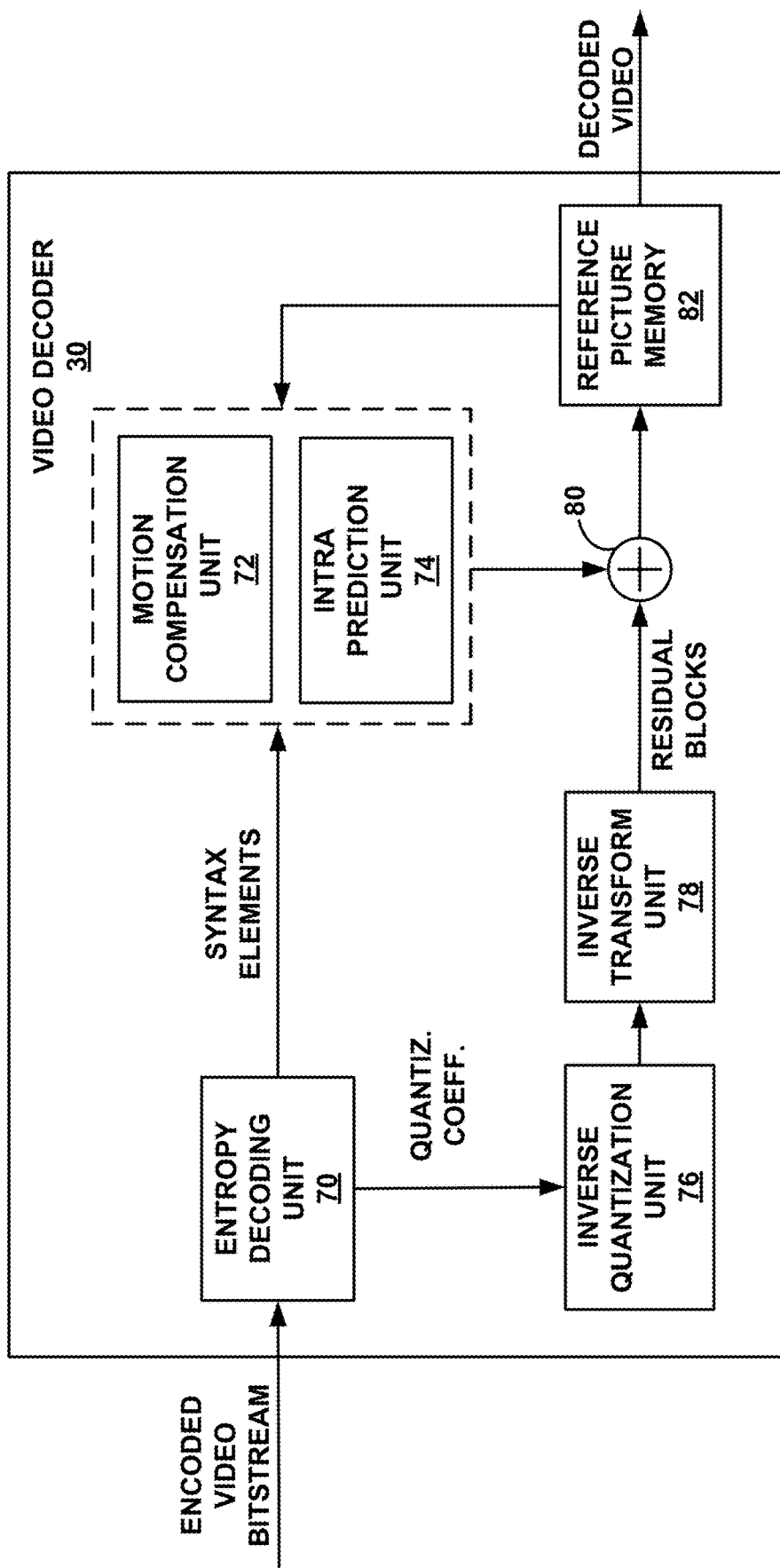
FIG. 3 is a block diagram illustrating an example of a video decoder that may implement techniques described in this disclosure.

FIG. 3 is a block diagram illustrating an example of a video decoder 30 that may implement techniques described in this disclosure. This is only one example of a video decoder that may perform the techniques described herein. Other video decoders, including video decoders that include additional features or fewer features, may still be enabled to perform the techniques described herein. For instance, video decoder 30 may further include a battery or other power sources. In other instances, video decoder 30 may include a memory or other storage device configured to store input video data.

In the example of FIG. 3, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

Video decoder 30 generally uses the process discussed above to decode each block of each picture in a coded video sequence. In addition, in some examples, video decoder 30 may decode data indicating temporal layers to which pictures are assigned. Furthermore, video decoder 30 may be configured to decode pictures of other layers, e.g., other views, scalable video coding layers, or the like. In any case, video decoder 30 may further decode data indicating a layer to which each picture belongs, for one or more layers (e.g., of various video dimensions).

In accordance with the techniques described herein, video decoder 30 may decode pictures of video data where one or more regions of the picture are random accessible and one or more regions of the picture are not random accessible. Video decoder 30 may receive VR video data with a plurality of pictures and decode one or more of the pictures depending on a current viewport. When the video decoder 30 changes viewpoints, video decoder 30 may search for a random accessible region in one or more of the pictures of the new viewport. The random accessible region may be in a picture that further includes other regions that are not random accessible. After locating a region that has random accessibility, video decoder 30 may first decode the random accessible region prior to decoding a remainder of the pictures in the new viewport. Video decoder 30 may determine which regions are random accessible based on syntax elements received in a bitstream from video encoder 20.

For the purposes of this disclosure, random access refers to the decoding of a video bitstream starting from a coded picture that is not the first coded picture in the bitstream. Random access to a bitstream is used in many video applications, such as broadcasting and streaming, e.g., for users to switch between different channels, to jump to specific parts of the video, or to switch to a different bitstream for stream adaptation (of the bit rate, frame rate, spatial resolution, and so on). This feature is enabled by inserting random access pictures or random access points, many times in regular intervals, into the video bitstream.

Bitstream splicing refers to the concatenation of two or more bitstreams or parts thereof. For example, a first bitstream may be appended by a second bitstream, possibly with some modifications to either one or both of the bitstreams to generate a spliced bitstream. The first coded picture in the second bitstream may also be referred to as the splicing point. Therefore, pictures following the splicing point in the spliced bitstream may originate from the second bitstream, while pictures preceding the splicing point in the spliced bitstream may originate from the first bitstream.

Splicing of bitstreams may be performed by bitstream splicers. Bitstream splicers are often lightweight (i.e., requiring less hardware or less complicated software) and less intelligent than encoders. For example, bitstream splicers may not be equipped with entropy decoding and encoding capabilities.

Bitstream switching may be used in adaptive streaming environments. A bitstream switching operation for a certain picture in the switched-to bitstream is effectively a bitstream splicing operation, wherein the splicing point is the bitstream switching point, i.e., the first picture from the switched-to bitstream.

Instantaneous decoding refresh (IDR) pictures, as specified in AVC or HEVC, may be used for random access. However, since pictures following an IDR picture in the decoding order cannot use pictures decoded prior to the IDR picture as reference pictures, bitstreams relying on IDR pictures for random access may have significantly lower coding efficiency.

To improve coding efficiency, the concept of clean random access (CRA) pictures was introduced in HEVC to allow pictures that follow a CRA picture in the decoding order but precede the CRA picture in the output order to use pictures decoded before the CRA picture as a reference picture. Pictures that follow a CRA picture in decoding order but precede the CRA picture in output order may be referred to as leading pictures associated with the CRA picture (or leading pictures of the CRA picture). The leading pictures of a CRA picture are correctly decodable if the decoding starts from an IDR or CRA picture before the current CRA picture. However, the leading pictures of a CRA picture may be decoded incorrectly when random access from the CRA picture occurs. As such, the leading pictures are typically discarded during random access decoding. To prevent error propagation from reference pictures that may not be available depending on where the decoding starts, all pictures that follow a CRA picture both in the decoding order and the output order may not use any picture that precedes the CRA picture either in decoding order or output order (which includes the leading pictures) as a reference picture.

The concept of broken link access (BLA) picture was further introduced in HEVC after the introduction of CRA pictures and based on the concept of CRA pictures. A BLA picture typically originates from a bitstream splicing operation at the position of a CRA picture. In the spliced bitstream, the splicing point CRA picture is changed to a BLA picture.

IDR picture, CRA picture and BLA picture are collectively referred to as intra random access point (IRAP) pictures. A difference between BLA pictures and CRA pictures is that, for a CRA picture, the associated leading pictures are correctly decodable if the decoding starts from a RAP picture before the CRA picture in decoding order, and may be incorrectly decoded when random access from the CRA picture occurs (i.e., when the decoding starts from the CRA picture, or in other words, when the CRA picture is the first picture in the bitstream). For a BLA picture, the associated leading pictures may be incorrectly decoded in all cases, even when the decoding starts from a RAP picture before the BLA picture in decoding order.

For a particular CRA or BLA picture, some of the associated leading pictures are correctly decodable even when the CRA or BLA picture is the first picture in the bitstream. These leading pictures are referred to as random access decodable leading (RADL) pictures, and other leading pictures are referred to as random access skipped leading (RASL) pictures.

Random access can be used in various applications, including virtual reality (VR). VR is the ability to be virtually present in a non-physical world created by the rendering of natural and/or synthetic image and sound correlated by the movements of the immersed user allowing the user to interact with that world. With the recent progress made in rendering devices, such as head mounted displays (HMD) and VR video (often also referred to as 360-degree video) creation, a significant quality of experience can be offered. VR applications include gaming, training, education, sports video, online shopping, adult entertainment, and so on.

A typical VR system may include various components and steps. A camera set may be used to capture VR video, which typically consists of multiple individual cameras pointing to different directions and ideally collectively covering all viewpoints around the camera set. From these viewpoints, a video device may utilize the process of image stitching, where video pictures taken by the multiple individual cameras are synchronized in the time domain and stitched in the space domain to be a spherical video, but mapped to a rectangular format, such as equi-rectangular (like a world map) or cube map. The video in the mapped rectangular format may be encoded/compressed using a video codec, e.g., H.265/HEVC or H.264/AVC.

The compressed video bitstream(s) may be stored and/or encapsulated in a media format and transmitted (possibly only the subset covering only the area being seen by a user) through a network to a receiver. The receiver receives the video bitstream(s) or part thereof, possibly encapsulated in a format, and sends the decoded video signal or part thereof to a rendering device. The rendering device can be, e.g., an HMD, which can track head movement and even eye movement, and may render the corresponding part of the video such that an immersive experience is delivered to the user.

A distinct feature of VR video compared to normal video is that, in VR, typically only a subset of the entire video region represented by the video pictures, corresponding to the current field of view (FOV) may be displayed, while in normal video applications typically the entire video region is displayed. FOV is sometimes also referred to as viewport, e.g., the area currently being seen by the user. This feature may be utilized to improve the performance of VR video systems, e.g., by using viewport dependent projection mapping or viewport dependent video coding. The performance improvement can be either or both of lower transmission bandwidth and lower decoding complexity compared to conventional VR video systems under the same resolution or quality of the video part presented to the user.

Viewport-dependent projection mapping may also be referred to as asymmetric projection mapping. One example is sub-sampled cube-map. A typical cube-map consists of six equal-sized faces. In one example of a sub-sampled cube-map, one of the faces can be kept unchanged, while the face on the opposite side of the cube can be sub-sampled or down-scaled to a smaller size located at the center area of the original face shape, and other faces are geometrically scaled accordingly (still keeping the six faces). The extreme example is to down-scale the face on the opposite side of the cube to be a single point, and thus the cube becomes a pyramid. In another example of sub-sampled cube-map, some faces are proportionally down-sized e.g., by a 2×2 ratio (i.e., 2:1 in each direction parallel to an edge of the face). Such down-sized scaling may also be applied to different regions for other projection mappings such as equi-rectangular. One example is to down-size both the upper and bottom regions (i.e., the poles) of the shape.

Viewport-dependent video coding may also be referred to as viewport based partial video decoding, as the key may be to enable decoding only partially for the encoded video region to provide sufficient information for display of the current FOV or viewport. In one example of viewport dependent video coding, the VR video may be coded using motion-constrained sets of tiles such that each potential region covering a FOV or viewport can be independently decoded from other regions. For a particular current FOV or viewport, the coded video data of the minimum set of independently decodable tiles that cover the current FOV or viewport may be sent to the client, decoded, and displayed. A shortcoming of this approach may be that, when the user turns his or her head quickly to a new FOV that is not covered by the sent video data, nothing in the area not covered by the tiles of the video data can be seen before the data covering the new FOV arrives. This may happen unless the round-trip time of the network is extremely low, e.g., at a magnitude of 10 ms, which may not be feasible, or at least may be a computationally challenging criterion.

Another example of viewport dependent video coding may be independent multi-resolution coding (IMRC). In IMRC, the spherical/panorama video may be encoded at multiple different resolutions independent of each other, and each representation may be coded using motion-constrained sets of tiles. The receiver may choose to decode different portions of the spherical/panorama video at different resolutions. Typically, the portion of the spherical video that is being currently observed by the user, i.e., the current field of view (FOV) or the current viewport, may be part of the video bitstream coded at the highest resolution. The region surrounding the current FOV is part of the video bitstream coded using a slightly lower resolution. The portion of the panorama directly behind the observer's head is part of the video bitstream coded at the lowest resolution. It is claimed that, in case of a head movement by the user, the user experience will degrade only by a small amount in most cases, and the quality degradation being most severe only in case of very large sudden head movement.

In yet another example of viewport-dependent video coding, video bitstreams of multiple-resolutions are coded using a scalable video codec, such as SHVC. In addition, the entire bitstream of the lowest resolution video (or the base layer) may be sent. The lowest resolution video does not need to be coded using tiles or motion-constrained sets of tiles, though this method of viewport dependent video coding would also work if it is coded using tiles or motion-constrained sets of tiles. For other aspects, the same strategy as described above is applied. This approach allows more efficient coding of the lowest resolution video because coding of tiles or tile motion-constrained sets of tiles reduces coding efficiency, and also more efficient coding of streams of higher resolutions due the use of inter-layer prediction. Furthermore, this approach also allows for more efficient FOV switching, because once FOV switching is initiated, the server or edge server can immediately stop sending video data that is from the video stream of a higher resolution (than the base layer) and that is not covering any region of the new FOV. If the video data of the lowest resolution covering the current FOV is not sent (e.g., only the video data of the highest resolution covering the current FOV is sent), during FOV switching, the server may continue sending video data that is from the video stream of a highest resolution and that is covering only the old FOV or part thereof such that the user can at least see the lowest-quality video in case he/she turns back to the old FOV or part thereof.

Using viewport-dependent VR systems, when a user changes their FOV, the decoding and display of the new viewport can only start from the next IRAP picture. Typically, an IRAP picture is present infrequently (e.g., once per second) in a coded bitstream because coding an IRAP picture is much less efficient and thus requires many more bits when compared to other types of coded picture (e.g., P-picture or B-picture). When a VR system uses viewport-dependent projection mapping, until the next IRAP picture is received in the new viewport, the VR player may only display a region from the current viewport which has lower picture quality, as the user's FOV may not be the part of the picture in that viewport that is coded with the highest quality due to largely uneven distribution of pixels per degree of such projection mappings. Similarly, when a VR system uses viewport-dependent partial video decoding (e.g., IMRC or the SHVC based partial video decoding scheme), until the next IRAP picture is present in the representation or layer with high quality/resolution, the VR player can only display regions from a representation/layer with lower quality/resolution. To minimize the period of displaying lower quality/resolution regions when user changes their FOV, a video coding device may encode the bitstream with more frequent IRAP pictures. However, such strategy consequently lower the coding efficiency of the bitstream and making the bitstream to have higher bitrate.

This disclosure describes techniques to address the problem mentioned above. One or more of these techniques described below may be applied independently, or in combination with others.

Instead of coding a whole picture as an IRAP picture, video encoder 20 may code only one or more regions covering a subset of the whole picture with random accessibility. A region of a particular picture is said to be with (or is said to have) random accessibility if it is possible to correctly decode the region of the particular picture, and the corresponding regions in all subsequent pictures in output order, when coded video data of all other regions of these pictures are not available and no pictures preceding the particular picture in decoding order is available. This may entail the region of the particular picture and the corresponding regions in all subsequent pictures in output order not depending on, directly or indirectly, any coded video data of pictures preceding the particular picture in decoding order or coded video data of any other region in all these pictures. Alternatively, both instances of "in output order" above may be changed to "in decoding order."

For pictures following the picture with a random accessible region in the coding order, or for other regions within the same picture as the random accessible region, video encoder 20 may utilize the motion information used to encode the random accessible region in the coding of the respective region. In other words, the other regions in the same picture as the random accessible region or pictures following the random accessible region in the coding order or the output order may be dependent on the random accessible region, or may be dependent on other regions that are in turn dependent on the random accessible region.

The regions coded to be random accessible may be tiles, slices, sets of tiles, sets of slices, or other regions that are subsets of pictures. The corresponding region may be defined as the spatially collocated region, or a different region otherwise defined. A region that has random accessibility is referred to as a random accessible region and is said to be random accessible. An example of a random accessible region is a tile that is intra-coded and its collocated tiles in subsequent pictures are motion-constrainedly coded like a tile that is the only tile in a motion-constrained tile set as indicated by the temporal motion-constrained tile sets SEI message in HEVC. An IRAP picture is also said to be fully random accessible, and a picture that contains random accessible regions but may also contain regions that are not random accessible is also said to be regional random accessible. When all regions in a picture are random accessible, then the picture is fully random accessible and can be coded as an IRAP picture. However, a region in an IRAP picture may or may not be random accessible. In other words, a fully random accessible picture may or may not be regional random accessible.

Video encoder 20 may further use indication/signaling to indicate a random accessible region. Video encoder 20 may provide such signaling in a header of coded picture, a header of a slice, a header of the region itself (named region header for simplicity), some special metadata in an ISOBMFF file containing the bitstream, a special supplemental enhancement information (SEI) message, or any other means.

A new picture type can be defined to indicate a regional random accessible picture, that is, a picture where one or more regions/slices/tiles within that picture are random accessible. For this new picture type (e.g., identified by a particular NAL unit type), additional signaling is provided to indicate which region of the picture is random accessible (e.g., by a field or syntax element in the NAL unit header, slice header, or region header).

Alternatively, the definition of IRAP picture may be broadened such that a picture can be said to be an IRAP picture if one or more regions/slices/tiles in that picture are random accessible. In this case, an IRAP picture is a regional random accessible picture.

Video encoder 20 may also provide indication or signaling to indicate whether regions corresponding to a random accessible region in subsequent pictures in decoding order but earlier in output order (like the leading pictures) can be correctly decoded. Video encoder 20 may use new picture types (e.g., identified by NAL unit types similar to RADL and RASL pictures in HEVC) for this purpose.

For file formatting, a new sample grouping can be defined to indicate samples for which the pictures have coded regions, slices, tiles, sets of slices, or sets of tiles that are random accessible. Alternatively, existing sample grouping for random access point (RAP) samples may be updated to have an indication of whether the samples are fully random accessible or regional random accessible. For the latter case, the random accessible regions are further indicated.

Figure 4:
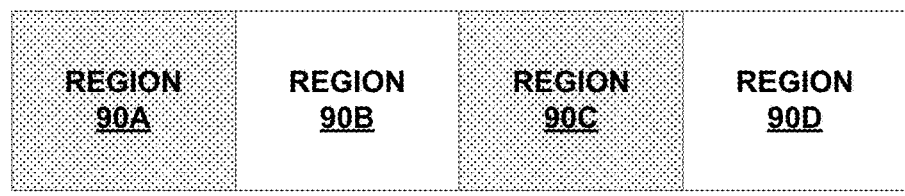
FIG. 4 is a conceptual diagram illustrating an example interleaving of random accessible regions in accordance with one or more techniques described in this disclosure.
Figure 4:
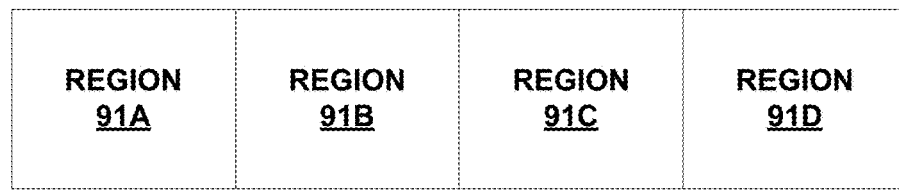
Figure 4:
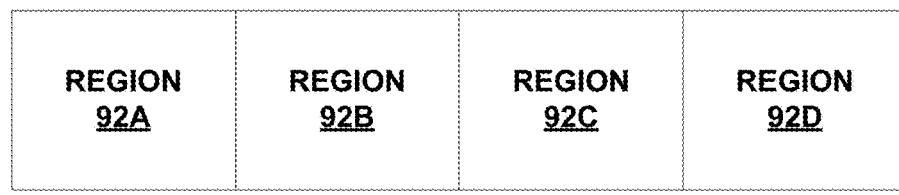
Figure 4:
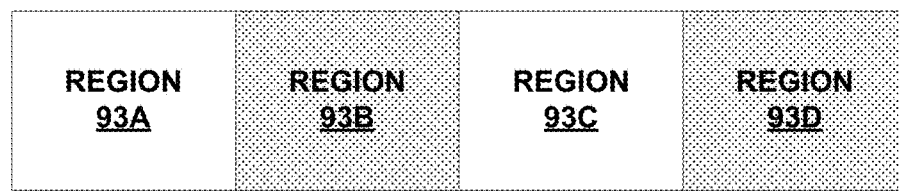
Figure 4:
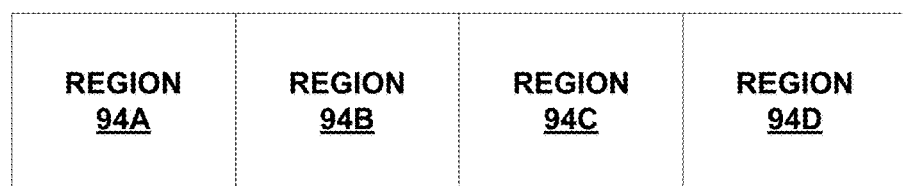
Figure 4:
Figure 4:

FIG. 4 is a conceptual diagram illustrating an example interleaving of random accessible regions 90A-90D, 91A-91D, 92A-92D, 93A-93D, and 94A-94D, in accordance with one or more techniques described in this disclosure. Random accessible regions (e.g., regions 90A, 90C, 93B, and 93D) may be present in regular and uniform frequency (e.g., every 16 pictures or 32 pictures, etc.; or every 0.5 seconds, 1 second, or 2 seconds, etc.). Furthermore, while the occurrence frequency of random accessible regions may be the same, they may occur in interleaved manner such as illustrated in FIG. 4.

Random accessible regions may also be present in non-regular frequency. One region may be coded to be random accessible more frequently (hence coded to be random accessible in more pictures) than another region. The frequency of occurrence of random accessible region can depend on many factors. Factors may include scene or content characteristics, e.g., regions that contains new scene, more action, or more object movements may be coded to be random accessible more frequently than other regions. Another factor may include director's intent, e.g., regions that cover FOVs that are expected be focused on by users according to director's intent may be coded to be random accessible more frequently than other regions.

Figure 5:
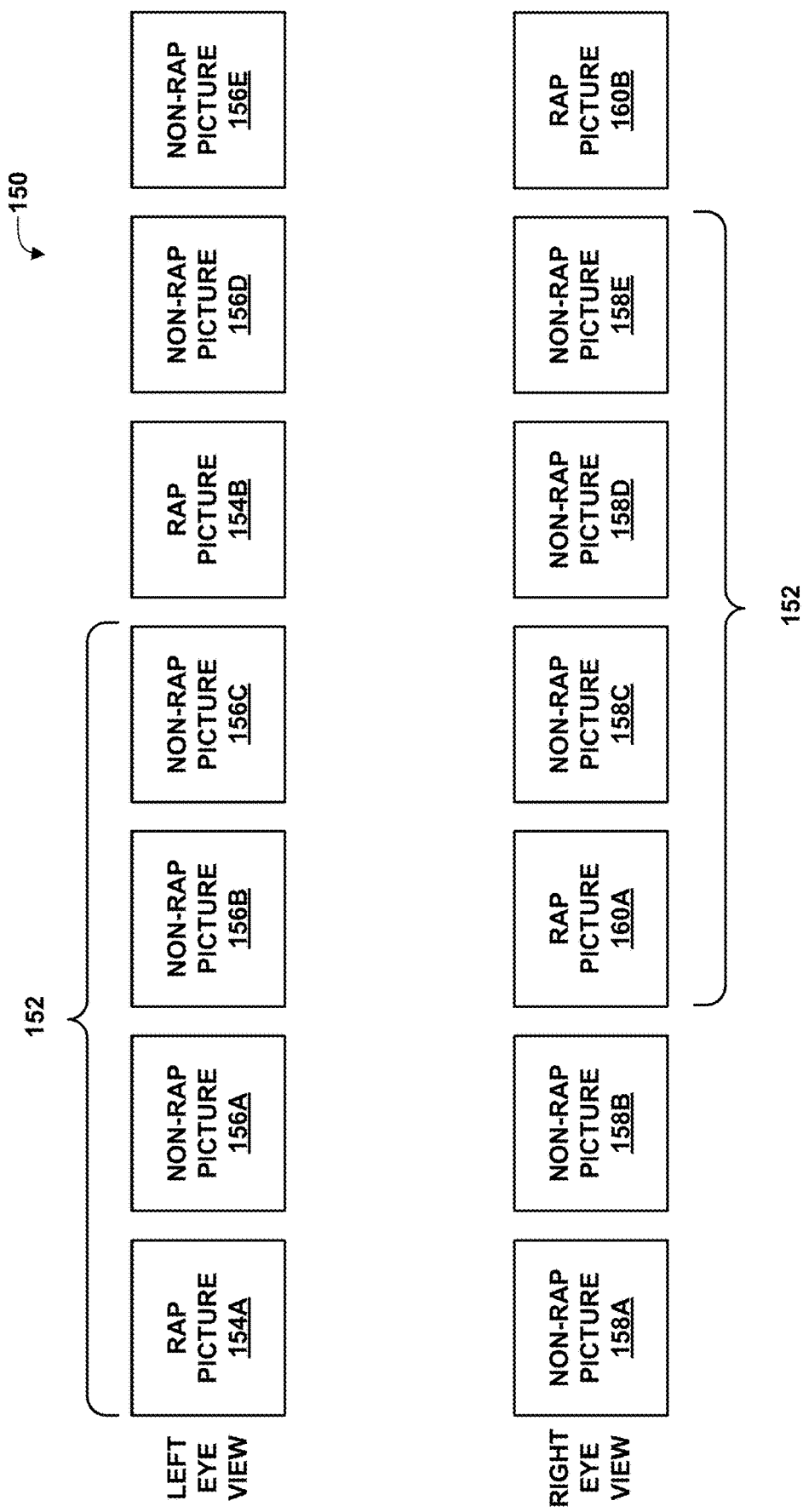
FIG. 5 is a conceptual diagram illustrating sequences of video data for two views, a left eye view and a right eye view.

FIG. 5 is a conceptual diagram illustrating sequences 150 of video data for two views, a left eye view and a right eye view. In particular, in this example, the left eye view includes random access point (RAP) pictures 154A, 154B and non-RAP pictures 156A-156E, and the right eye view includes non-RAP pictures 158A-158E and RAP pictures 160A, 160B. RAP pictures may also be referred to as switch points. A group of pictures (GOP) generally refers to a sequence of pictures including a RAP picture and subsequently non-RAP pictures in coding order up to the next RAP picture. In this example, GOPs have a GOP period 152 of four pictures, although it should be understood that this example period is shown for purposes of example. In general, the GOP period can be of any length/number of pictures.

Furthermore, the pictures of left eye view and the right eye view generally have the same quality for purposes of the techniques of this disclosure (e.g., the same spatial resolution). Thus, in general, these pictures would be retrieved for the left eye view and the right eye view together when a particular quality is selected, based on a region at which a visual focus of a user is directed. The user's visual focus may be determined, for example, using accelerometers, camera tracking, or other such methods.

In accordance with certain example techniques of this disclosure, GOP structure related latency (max I-frame delay) can be reduced in the case of stereo video data, as follows. Left and right channel I-frames (e.g., RAP pictures 154A, 154B, 160A, 160B) can be offset in time from each other by one-half GOP period. Thus, the delay to the I-frame, either at the left channel or right channel, will always be less than or equal to ½ GOP period. The human eye may be able to perceive improvement in picture quality if higher resolution content is observed by either eye. Thus, the perceived latency when shifting from low resolution to high resolution may be reduced by ½ of a GOP period, using these techniques.

Accordingly, in the example of FIG. 5, RAP pictures of the right eye view occur halfway between the GOP periods of RAP pictures of the left eye view. That is, RAP picture 160A of the right eye view occurs halfway between RAP pictures 154A, 154B of the left eye view, and RAP picture 154B of the left eye view occurs halfway between RAP pictures 160A, 160B of the right eye view.

Thus, if a switch to the pictures of the left eye view and the right eye view were to occur at, e.g., RAP picture 154A and non-RAP picture 158A, destination device 14 may switch to the left eye view before switching to the right eye view. That is, destination device 14 may retrieve RAP picture 154 and non-RAP picture 156A of the left eye view, but continue to retrieve right eye view pictures having a different quality (e.g., spatial resolution) instead of non-RAP pictures 158A, 158B. Then, upon reaching RAP picture 160A, destination device 14 may retrieve non-RAP picture 156B and RAP picture 160A. This may reduce GOP structure related latency, vis-à-vis if both RAP pictures for the left and right eye views occurred at the position of RAP picture 160A.

Similarly, if the switch were to occur at the position of RAP picture 160A, destination device 14 may retrieve RAP picture 160A and non-RAP picture 158C of the right eye view, but continue to retrieve pictures of a previous left eye view instead of non-RAP pictures 156B, 156C. Upon reaching RAP picture 154B, though, destination device 14 may retrieve RAP picture 154B and non-RAP picture 158D.

In the event that the user's visual focus changes and the video data includes two or more views (e.g., for three-dimensional playback), region determination unit 34 may switch sets of video data for the views at different times, as explained with respect to FIG. 5. That is, random access points (RAPs) of the views, also referred to as switch points, may be offset between the views, which may reduce latency associated with switching from one set of video data to another. In this manner, video data may be retrieved from one set of video data for one view having a higher quality than video data retrieved from another set of video data for another view, until a RAP picture of the other view can be retrieved.

Quality of the various sets of video data may be defined according to one or more characteristics. As explained above, one example quality metric is spatial resolution (that is, pixel density). Another possible quality metric, which may be used in addition or in the alternative, is bitrate of the corresponding video data. In this manner, different representations of video data (e.g., in accordance with Dynamic Adaptive Streaming over HTTP (DASH)) may be provided for each of the regions. For example, various representations may be provided for each of the regions, and in some examples, one or more representations may be provided that correspond to multiple regions. Each of the representations for a given region (or set of regions) may generally be switchable to the others, e.g., such that switch points or random access points (RAPs) may be aligned between the representations.

Furthermore, each of the representations for a given region (or set of regions) may have a distinct bitrate. A manifest file, such as a media presentation description (MPD) may include metadata for the representations, such as bitrates of the representations, uniform resource locators (URLs) for segments of the representations, and/or a mapping of representations to regions of the display. The metadata/manifest file may also describe locations of switch points within the representations. In this manner, destination device 14 may select a representation for a region based on a user's visual focus (and thus, the region's proximity to the user's field of view) and quality of the representation, which may refer to the bitrate of the representation. Other examples of quality characteristics include quantization parameters (QPs) for blocks, slices, and/or pictures in the video data, peak signal to noise ratio (PSNR) for the video data, and bitrates for the video data.

Figure 6:
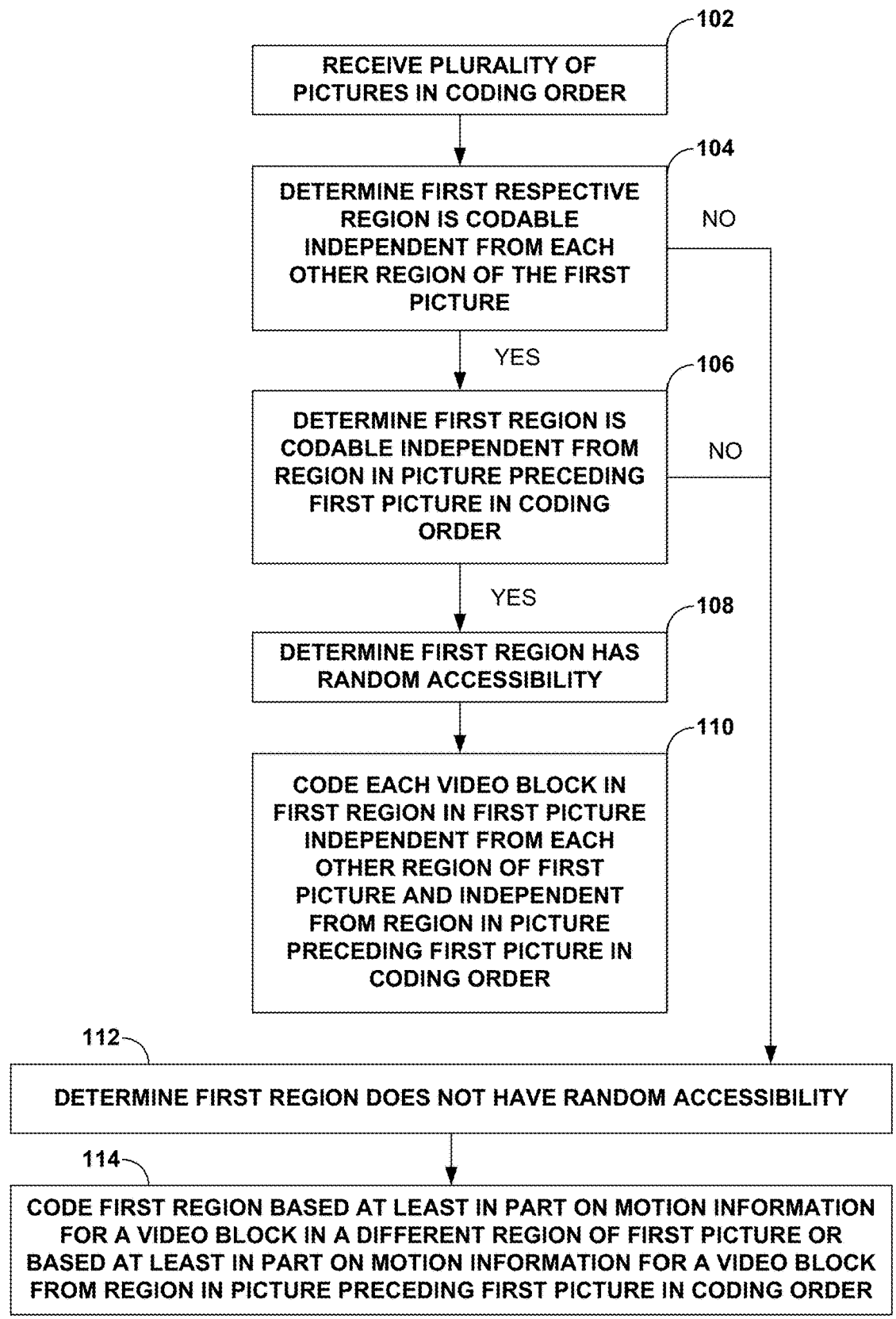
FIG. 6 is a flow chart illustrating an example technique for determining a random accessible region within a picture of video data in accordance with one or more techniques described in this disclosure.

FIG. 6 is a flow chart illustrating an example technique for determining a random accessible region within a picture of video data in accordance with one or more techniques described in this disclosure. The method of FIG. 6 is explained with respect to a video coding device, such as video encoder 20 of FIG. 1, although it should be understood that other devices may be configured to perform the same or a similar method.

In accordance with techniques of this disclosure, the video coding device may determine whether a region in a picture has random accessibility. For instance, the video coding device may receive a plurality of pictures in a coding order (102). Each respective picture of the plurality of pictures comprises a plurality of regions. For a first region in a first picture of the plurality of pictures, the video coding device may determine that the first region is codable independent from each other region of the first picture (104).

If the video coding device determines this to be true (YES branch of 104), the video coding device may also determine that the first region is codable independent from a first region in a second picture preceding the first picture in the coding order (106). In some examples, the first respective region may be a tile, a slice, a set of tiles, or a set of slices. In some examples, in determining that the first region is codable independent from a first region in a second picture preceding the first picture in the coding order, the video coding device may determine that a respective syntax element in a respective NAL unit header in each respective picture preceding the first picture in the coding order indicates that the respective picture is not available.

Responsive to determining that the first region is codable independent from each other region of the first picture and that the first region is codable independent from the first region in the second picture preceding the first picture in the coding order (YES branch of 106), the video coding device may determine that the first respective region in the first picture has random accessibility (108). The video coding device may then code each video block in the first region in the first picture independent from each other region of the first picture and independent from the first region in the second picture preceding the first picture in the coding order (110).

If the video coding device determines that the first region is not codable independent from other regions of the first picture (NO branch of 104) or that the first region is not codable independent from the first region in the second picture preceding the first picture in the coding order (NO branch of 106), the video coding device may determine that the first respective region in the first picture does not have random accessibility (112). As such, the video coding device may code a video block in the first region in the first picture based at least in part on motion information for a video block in another region of the first picture or based at least in part on motion information for a video block in a region in a picture preceding the first picture in the coding order (114).

In some examples, the video coding device may further determine that each region in the first picture has random accessibility. Responsive to determining that each region in the first picture has random accessibility, the video coding device may determine that the first picture is an intra random access point picture. As such, the video coding device may code each video block in the first picture independent from each other picture in the coding order.

In some examples, responsive to determining that the first region has random accessibility, the video coding device may signal a syntax element that indicates that the first region has random accessibility. The syntax element may be located in a header of the first picture, a header of a slice, a header of the first respective region, a NAL unit header, or in metadata. The video coding device may encode the syntax element in a bitstream.

In some examples, responsive to determining that the first respective region has random accessibility, the video coding device may determine that the first picture is an intra random access point picture. Responsive to determining that the first picture is the intra random access point picture, the video coding device may signal a syntax element that indicates that the first picture is the intra random access point picture. The video coding device may then encode the syntax element in a bitstream.

In some examples, the video coding device may define a sample grouping to indicate that the first picture has a randomly accessible region. Alternatively, the video coding device may define a sample grouping to indicate whether the first picture is fully randomly accessible or whether only a portion of the regions of the first picture are randomly accessible.

In some examples, the video coding device may further, for a third picture that follows the first picture in the coding order, determine that a threshold number of pictures in the coding order have been coded since coding the first region of the first picture. Responsive to determining that the threshold number of pictures in the coding order have been coded since coding the first region of the first picture, the video coding device may determine that a region in the third picture corresponding to the first region of the first picture has random accessibility. As such, the video coding device may code each video block in the region in the third picture corresponding to the first region of the third picture independent from each other region of the third picture and independent from any region in a fourth picture preceding the third picture in the coding order.

Figure 7:
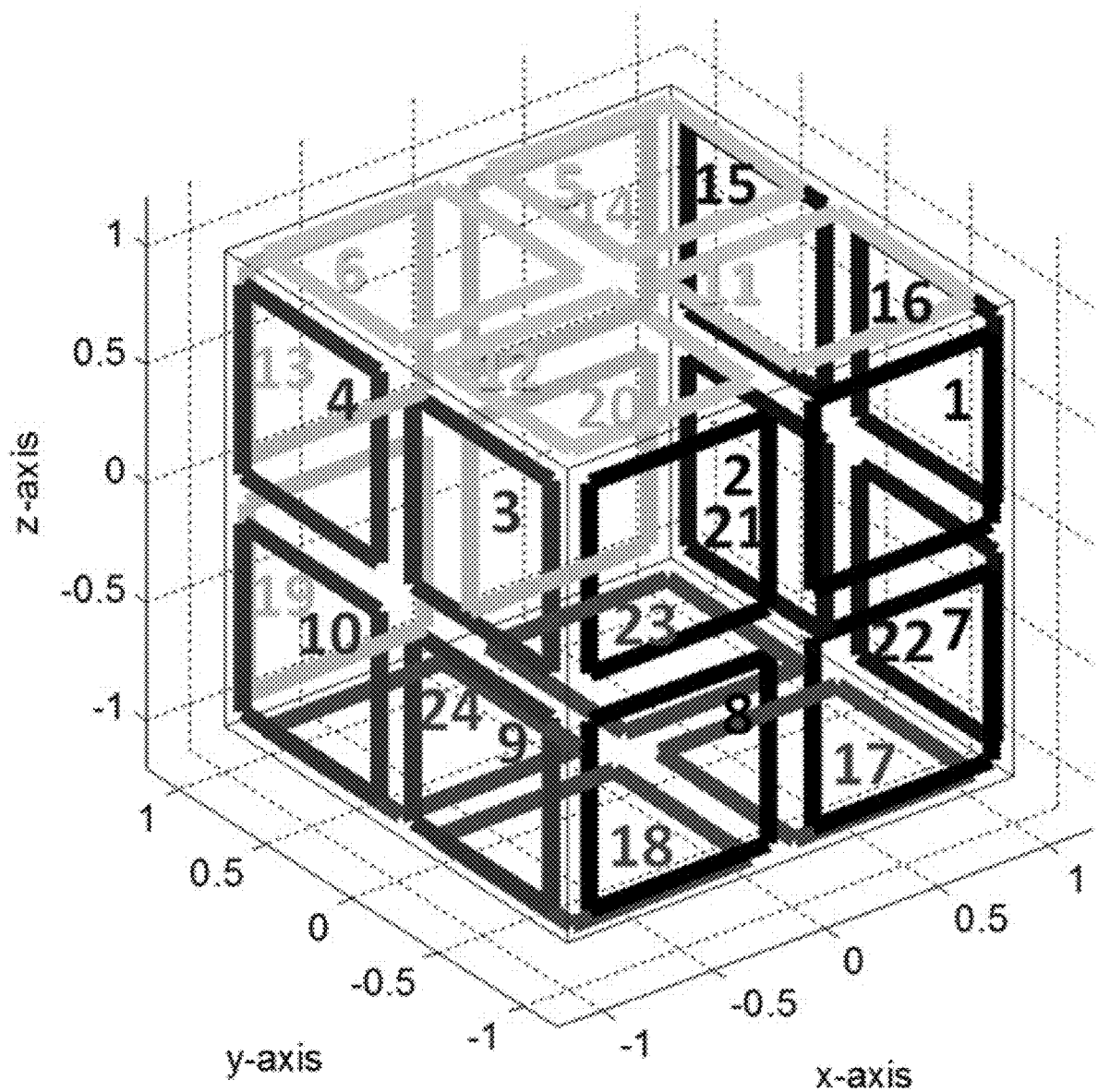
FIG. 7 is a conceptual diagram illustrating a cube of 360-degree video data having six faces, each divided into four tiles, for a total of twenty-four tiles (or regions).

FIG. 7 is a conceptual diagram illustrating a cube of 360-degree video data having six faces, each divided into four tiles, for a total of twenty-four tiles (or regions). The tiles are represented in a three dimensional x, y, and z axis space with each square face shown having a one-unit by one-unit area in the corresponding two-dimensional space. A first face contains tiles 3, 4, 9, and 10, a second face contains tiles 1, 2, 7, and 8, a third face contains tiles 15, 16, 21, and 22, a fourth face contains tiles 13, 14, 19, and 20, a fifth face contains 5, 6, 11, and 12, and a last, sixth face contains tiles 17, 18, 23, and 24.

An example algorithm for requesting video data for tiles, the video data having different qualities (e.g., spatial resolutions), based on a user's field of view (FOV) is described with respect to FIGS. 7 and 8 below. Destination device 14 (e.g., region determination unit 34) may be configured to perform this or a similar algorithm.

It is assumed that region determination unit 34 receives a cubemap input having a twenty-four tile configuration (four tiles per cube face) as shown in FIG. 7. It is assumed that video data is available for each of the tiles at four qualities (e.g., resolution layers), and that the tile numbers follow the order shown in FIG. 7.

Figure 8:
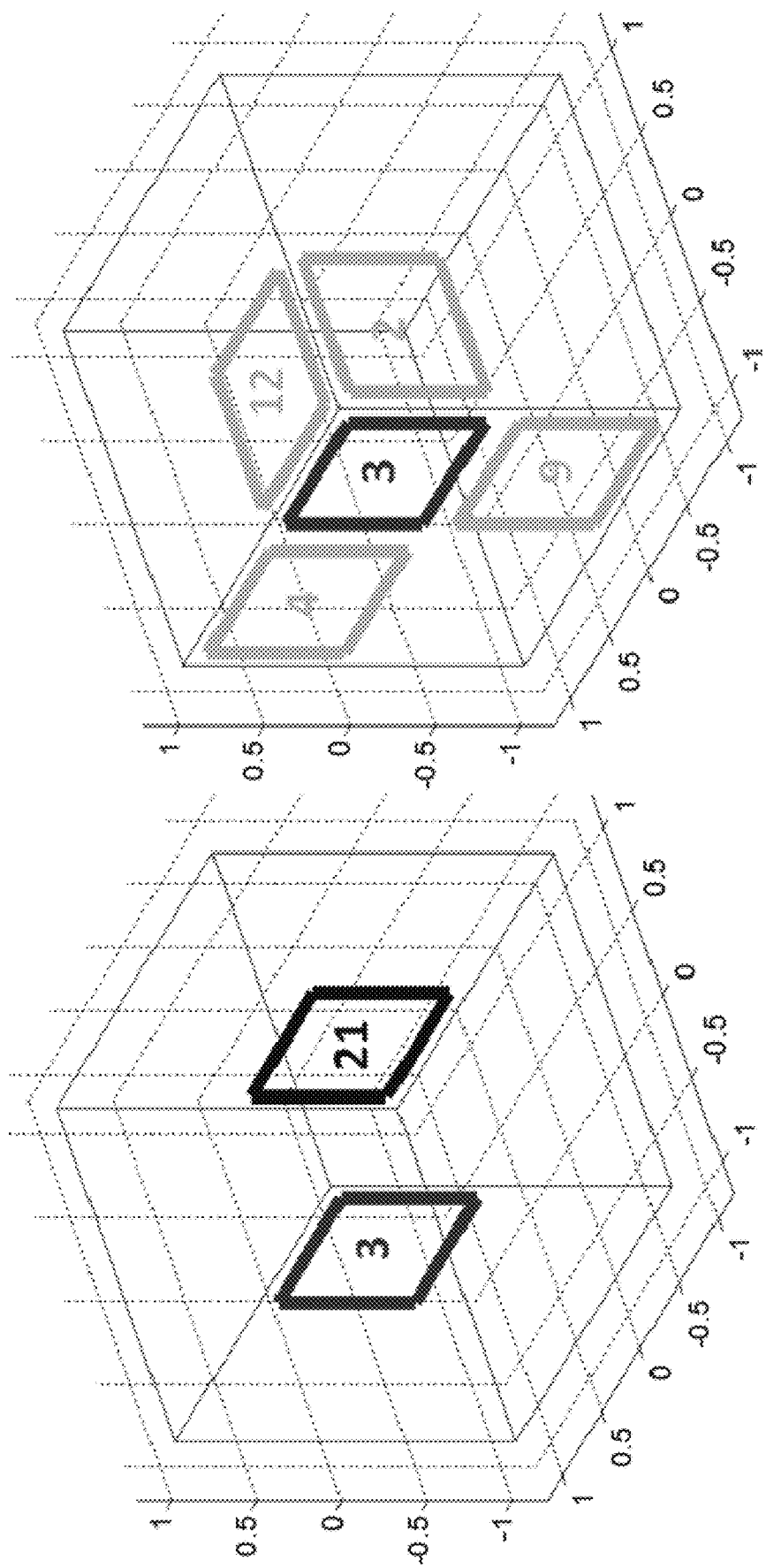
FIG. 8 is a conceptual diagram illustrating examples of opposite tiles and adjacent tiles for an example tile of FIG. 7.

FIG. 8 is a conceptual diagram illustrating examples of opposite tiles and adjacent tiles for tile number 3 of FIG. 7. For each tile on the cube structure, its opposite tile is defined as the tile obtained by mirroring the tile location through the center of the cube. The four adjacent tiles to a current tile (e.g., tile 3) are the four tiles that have adjacent edges in the cube structure with the current tile. For example, as illustrated in FIG. 8, the opposite tile of tile number 3 is tile 21. The adjacent tiles of tile number 3 are tiles 2, 4, 9 and 12. The opposite tile number and four adjacent tile numbers for each tile in the cube structure may be saved in a Look-up-Table in a memory of destination device 14, e.g., a memory of region determination unit 34.

Given a user's FOV, destination device 14 may execute the algorithm to solve the problem of assigning the twenty-four tiles of the cube structure to different qualities (e.g., resolution layers) of video data, with layer one being the highest quality (e.g., resolution), and layer four being the lowest quality (e.g., resolution). Based on the user's requested FOV, destination device 14 executes the algorithm to first calculate the area of the FOV that is covered by each tile. For purposes of explanation, resolution is used as an example of quality in the discussion below, although it should be understood that additional and/or alternative quality metrics may be used.

According to the algorithm, destination device 14 defines a threshold for area coverage $A_{th}$ (for example, 5% of the total area of the cube map projection). All tiles that cover an area larger than or equal to the threshold $A_{th}$ (that is, tiles having an area larger than the threshold area, e.g., larger than or equal to 5% of the total area of the cube map projection, where area may be calculated in pixels) are assigned to resolution layer one. Destination device 14 assigns opposite tiles of layer one tiles to layer four. Destination device 14 assigns tiles that have non-zero area coverage smaller than the threshold $A_{th}$ to resolution layer two, and opposite tiles of layer two tiles to layer three. At this stage, the algorithm has usually caused destination device 14 to assign most of the 24 tiles to their corresponding resolution layers.

For each of the remaining unassigned tiles, destination device 14 may calculate a tile metric $T_A$. The tile metric $T_A$ for a certain tile equals the sum of the FOV areas covered by its 4 adjacent tiles. For example, $T_A$ for tile 3=sum of FOV areas covered by tiles 2, 4, 9 and 12. Destination device 14 may sort the remaining unassigned tiles in a descending order based on their $T_A$ metric. Destination device 14 may assign half of the remaining tiles with the highest $T_A$s to resolution layer two, and the other half with the lowest $T_A$s to resolution layer three.

Note that the algorithm only relies on the area coverage of each tile. Hence, the complexity of tile assignment is low. Using a threshold for area coverage $A_{th}$ may control the maximum number of tiles to be requested from the highest resolution layer one. The algorithm also balances the requests from different resolution layers by enforcing conditions: number of layer one tiles=number of layer four tiles, and number of layer two tiles=number of layer three tiles, in the example discussed above. Therefore, the algorithm can control the worst case maximum number of the total decoded pixels on the viewer's device, and ensure that this number is within the capabilities of the end user decoder (e.g., video decoder 30).

The tile request algorithm discussed above can be simplified to fewer resolution layers. For example, if there are only three resolution layers, then the same algorithm can be performed, but tile assignments from resolution layers two and three (or layers three and four) may be combined into a single resolution layer. The algorithm can be extended to use more than four resolution layers by defining more than one threshold for FOV area coverage. Finally, the algorithm can be also be extended to cover different geometrical representation of the input 360-degree video, other than the Cube-Map input with twenty-four tiles.

Figure 9:
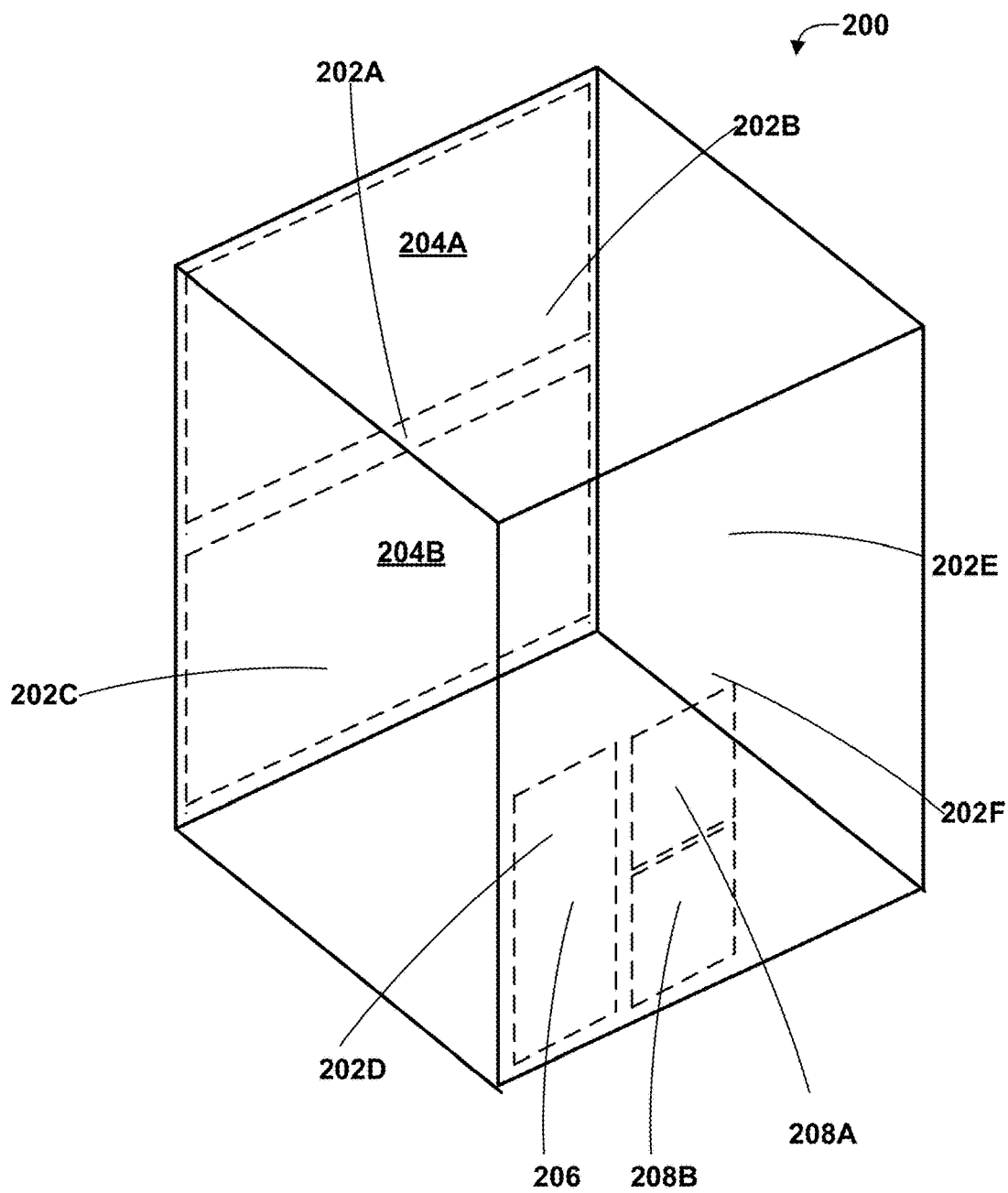
FIG. 9 is a conceptual diagram illustrating an example cube map projection.

FIG. 9 is a conceptual diagram illustrating an example cube map projection 200. Cube map projection 200 includes six faces 202A-202F (faces 202), including front face 202A, top face 202B, left face 202C, bottom face 202D, right face 202E, and rear face 202F. In this example, any or all of faces 202 may be divided into regions (also referred to as tiles herein). For example, each of faces 202 may be divided into four tiles, including an upper-left tile, an upper-right tile, a lower-left tile, and a lower-right tile. A source device, such as source device 12 (FIG. 1), may provide video data at a variety of quality levels (e.g., spatial resolutions, QPs, bitrates, PSNRs, or the like) for each of the tiles.

In addition, two or more of the tiles may be combined. For example, as discussed above (e.g., with respect to FIG. 4), source device 12 (FIG. 1) may provide video data for a large tile, which may encompass four small tiles. For example, the large tile may cover an entire one of faces 202. Thus, a separate set of video data may be available for the large tile, which may include one or more quality levels for the large tile.

Although a large tile covering a single one of faces 202 is possible as discussed above, in other examples, smaller tiles may be combined in other ways, such that video data is available for other tile combinations. In the example of FIG. 9, two horizontal tiles 204A, 204B are shown on front face 202A. Thus, although front face 202A may generally be partitioned into the four tiles discussed above, the upper-left and upper-right tiles may be combined to form horizontal tile 204A, and the lower-left and lower-right tiles may be combined to form horizontal tile 204B. In this manner, source device 12 (FIG. 1) may provide video data at one or more quality levels for horizontal tiles 204A, 204B.

Accordingly, depending on a user's FoV, destination device 14 (FIG. 1), and in particular, region determination unit 34, may determine that video data should be retrieved for either or both of horizontal tiles 204A, 204B. For example, if a user's FoV is directed to or near the center of the edge bordering front face 202A and top face 202B, region determination unit 34 may retrieve a high-quality version of video data for horizontal tile 204A, or an intermediate-quality version of the video data for horizontal tile 204A.

In addition, FIG. 9 also shows examples of smaller tiles. For example, source device 12 (FIG. 1) may provide video data for half-tiles, such as half-tile 206, or quarter-tiles, such as quarter tiles 208A, 208B. In general, video data may be provided for any of a variety of partitionings of cube map 200. Thus, it should not be assumed that only four tiles per cube face are possible, as any number of partitionings into tiles may be used in accordance with the techniques of this disclosure.

Figure 10:
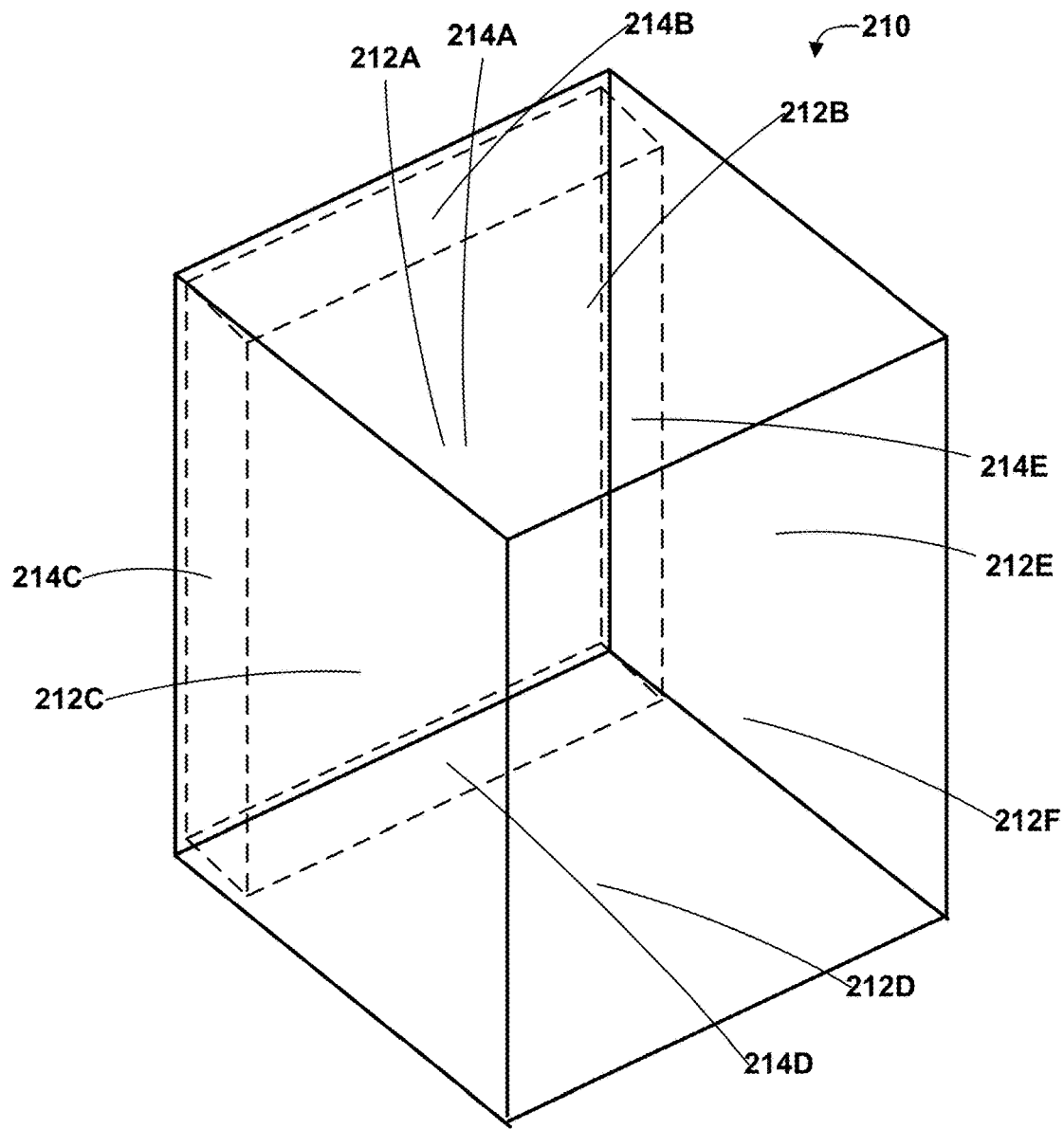
FIG. 10 is a conceptual diagram illustrating another example cube map projection.

FIG. 10 is a conceptual diagram illustrating an example cube map projection 210. Cube map projection 210 includes six faces 212A-212F (faces 212), including front face 212A, top face 212B, left face 212C, bottom face 212D, right face 212E, and rear face 212F.

As discussed above, source device 12 (FIG. 1) may provide video data for tiles of cube faces, such as faces 212, where there may be four tiles each for faces 212. In addition, however, source device 12 may provide video data for a "mega-tile" that covers, for example, an entire cube face and portions of neighboring cube faces. In the illustrated example of FIG. 10, such a mega-tile covers regions 214A-214E, where region 214A fully covers front face 212A, region 214B partially covers top face 212B, region 214C partially covers left face 212C, region 214D partially covers bottom face 212D, and region 214E partially covers right face 212E. The mega tile in this example does not cover any portion of rear face 212F.

In addition, source device 12 may provide a plurality of such mega-tiles (which may be referred to as cube-face-centered mega-tiles). The example mega-tile shown in FIG. 10 is centered on front face 212A. In some examples, source device 12 may provide six such mega-tiles, one mega-tile centered on each of faces 212. Furthermore, in addition or in the alternative, source device 12 may provide mega-tiles centered at corner vertices of cube map projection 210, as discussed below.

Figure 11:
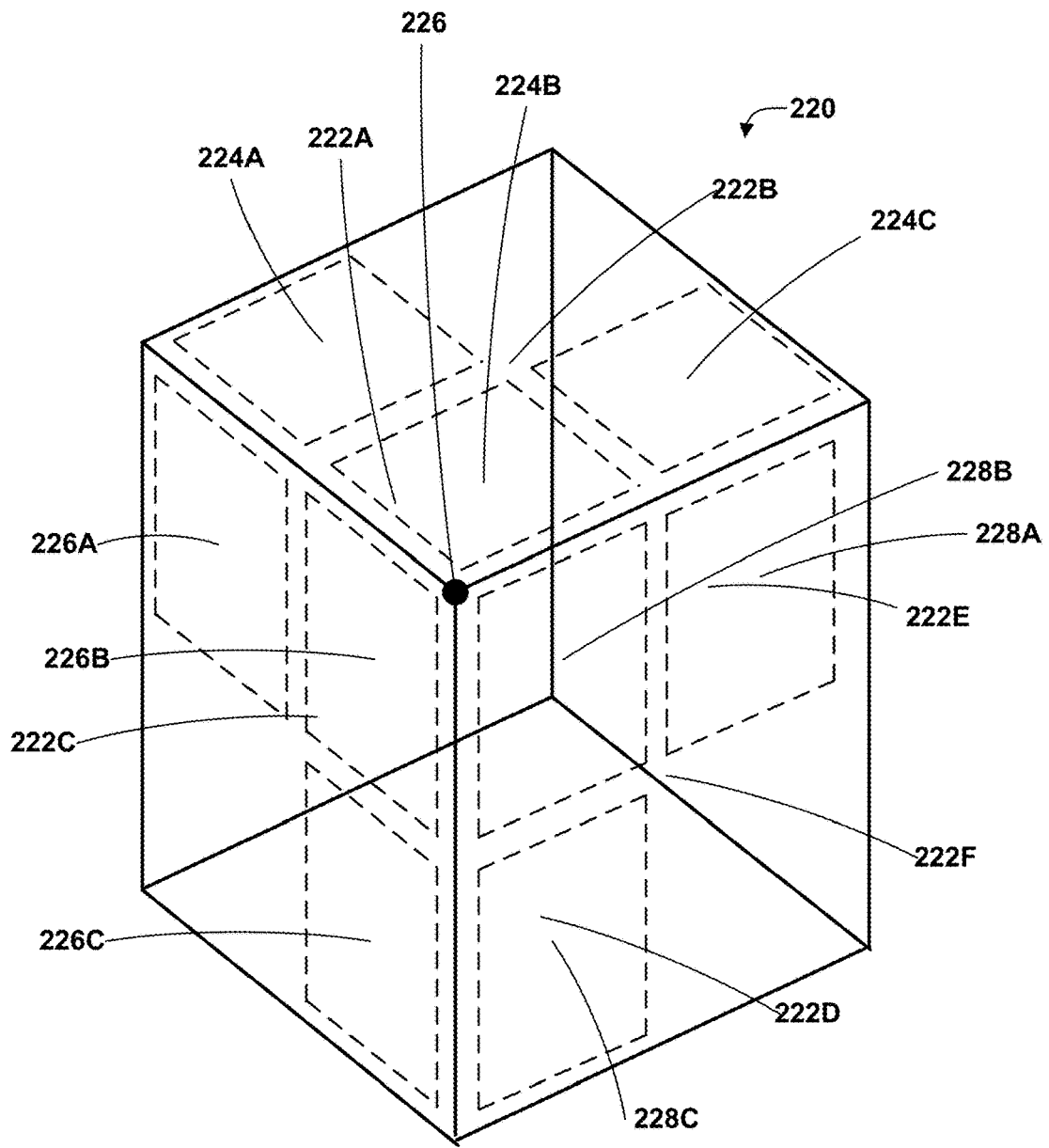
FIG. 11 is a conceptual diagram illustrating another example cube map projection.

FIG. 11 is a conceptual diagram illustrating an example cube map projection 220. Cube map projection 220 includes six faces 222A-222F (faces 222), including front face 222A, top face 222B, left face 222C, bottom face 222D, right face 222E, and rear face 222F. The example of FIG. 11 also depicts a mega-tile centered on vertex 226 of cube map projection 220. In particular, the mega-tile includes tiles 224A, 224B, and 224C on top face 222B, tiles 226A, 226B, and 226C of left face 222C, and tiles 228A, 228B, and 228C on rear face 222F.

Source device 12 (FIG. 1) may provide a plurality of such mega-tiles (which may be referred to as vertex-centered mega-tiles). For example, source device 12 may provide eight such mega-tiles, one mega-tile for each corner vertex of cube map projection 220. The techniques of FIG. 11 may be combined with the techniques of FIG. 10, such that source device 12 may provide fourteen mega-tiles, six cube-face-centered mega-tiles and eight vertex-centered mega-tiles.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A method of decoding video data, the method comprising:
    receiving an encoded video bitstream that comprises a plurality of coded pictures of 360-degree video data in a decoding order, wherein each picture comprises a plurality of regions;
    determining, for a first picture of the plurality of coded pictures, a current viewport corresponding to a field of view that is to be displayed, wherein the current viewport is different from a previous viewport, the field of view comprising a subset of the entire 360-degree video data represented by the first picture, wherein, when the first picture is not an intra random access point (IRAP) picture and the current viewport corresponds to an expected field of view, the current viewport corresponds to one or more randomly accessible regions within the first picture;
    searching for one of the randomly accessible regions within the first picture corresponding to the current viewport dependent on a syntax element indicating whether a particular region in the first picture corresponds to the randomly accessible region in the first picture, wherein a first region is the random accessible region when:
        the first region is codable independent from each other region of the first picture and the first region is codable independent from a second picture that precedes the first picture in a coding order; and
    responsive to determining that the first region is the randomly accessible region,
    decoding each video block of the first region independent from each other region of the first picture and independent from the second picture.

2. The method of claim 1, further comprising:
    determining that a second region of the first picture does not have random accessibility when the second region is not codable independent from a third region of the first picture or when the second region is not codable independent from a third picture preceding the first picture in the coding order; and
    decoding a video block of the second region based at least in part on motion information for a video block in the third region or based at least in part on motion information for a video block in the third picture.

3. The method of claim 1, wherein the first region comprises a tile, a slice, a set of tiles, or a set of slices.

4. The method of claim 1, further comprising:
    determining that each region in a third picture of the plurality of pictures has random accessibility;
    responsive to determining that each region in the third picture has random accessibility, determining that the third picture is an intra random access point picture; and
    decoding each video block of the third picture independent from each other picture of the plurality of pictures in the coding order.

5. The method of claim 1, further comprising
    determining that a respective syntax element in a respective NAL unit header in each picture preceding the first picture in the coding order indicates that the picture is not available.

6. The method of claim 1, further comprising:
    defining a sample grouping to indicate that the first picture has a randomly accessible region.

7. The method of claim 1, further comprising:
    defining a sample grouping to indicate whether a third picture is fully randomly accessible or whether only a portion of the regions of the third picture are randomly accessible.

8. The method of claim 1, further comprising:
    for a third picture that follows the first picture in the coding order, determining that a threshold number of pictures in the coding order have been coded since coding the first region of the first picture;
    responsive to determining that the threshold number of pictures in the coding order have been coded, determining that a region in the third picture corresponding to the first region of the first picture has random accessibility; and decoding each video block of the region in the third picture independent from each other region of the third picture and independent from a fourth picture that precedes the third picture in the coding order.

9. A video decoding device comprising:

a memory configured to store video data; and one or more processors configured to:
receive an encoded video bitstream that comprises a plurality of coded pictures of 360-degree video data in a decoding order, wherein each picture comprises a plurality of regions;
determine, for a first picture of the plurality of coded pictures, a current viewport corresponding to a field of view that is to be displayed, wherein the current viewport is different from a previous viewport, the field of view comprising a subset of the entire 360-degree video data represented by the first picture, wherein, when the first picture is not an intra random access point (IRAP) picture and the current viewport corresponds to an expected field of view, the current viewport corresponds to one or more randomly accessible regions within the first picture;
search for one of the randomly accessible regions within the first picture corresponding to the current viewport dependent on a syntax element indicating whether a particular region in the first picture corresponds to the randomly accessible region in the first picture, wherein a first region is the random accessible region when:
the first region is codable independent from each other region of the first picture and that the first region is codable independent from a second picture that precedes the first picture in a coding order; and
responsive to determining that the first region is the randomly accessible region,
decode each video block of the first region independent from each other region of the first picture and independent from the second picture.

10. The video coding device of claim 9, wherein the one or more processors are further configured to:
determine that a second region of the first picture does not have random accessibility when the second region is not codable independent from a third region of the first picture or when the second region is not codable independent from a third picture preceding the first picture in the coding order; and
decode a video block of the second region based at least in part on motion information for a video block in the third region or based at least in part on motion information for a video block in the third picture.

11. The video coding device of claim 9, wherein the first region comprises a tile, a slice, a set of tiles, or a set of slices.

12. The video coding device of claim 9, wherein the one or more processors are further configured to:
determine that each region in a third picture of the plurality of pictures has random accessibility;
responsive to determining that each region in the third picture has random accessibility, determining that the third picture is an intra random access point picture; and
decode each video block of the third picture independent from each other picture of the plurality of pictures in the coding order.

13. The video coding device of claim 9, wherein the one or more processors are configured to:
determine that a respective syntax element in a respective NAL unit header in each picture preceding the first picture in the coding order indicates that the picture is not available.

14. The video coding device of claim 9, wherein the one or more processors are further configured to:
define a sample grouping to indicate that the first picture has a randomly accessible region.

15. The video coding device of claim 9, wherein the one or more processors are further configured to:
define a sample grouping to indicate whether a third picture is fully randomly accessible or whether only a portion of the regions of the third picture are randomly accessible.

16. The video coding device of claim 9, wherein the one or more processors are further configured to:
for a third picture that follows the first picture in the coding order, determine that a threshold number of pictures in the coding order have been coded since coding the first region of the first picture;
responsive to determining that the threshold number of pictures in the coding order have been coded, determine that a region in the third picture corresponding to the first region of the first picture has random accessibility; and
decode each video block of the region in the third picture independent from each other region of the third picture and independent from a fourth picture that precedes the third picture in the coding order.

17. The video coding device of claim 9, wherein the video coding device comprises a video encoder comprising one of:
a microprocessor;
an integrated circuit (IC); or
a wireless communication device.

* * * * *